April 15, 1952 A. E. McKEE 2,593,046
OXYGEN ADMINISTRATION
Filed May 29, 1944 3 Sheets-Sheet 1
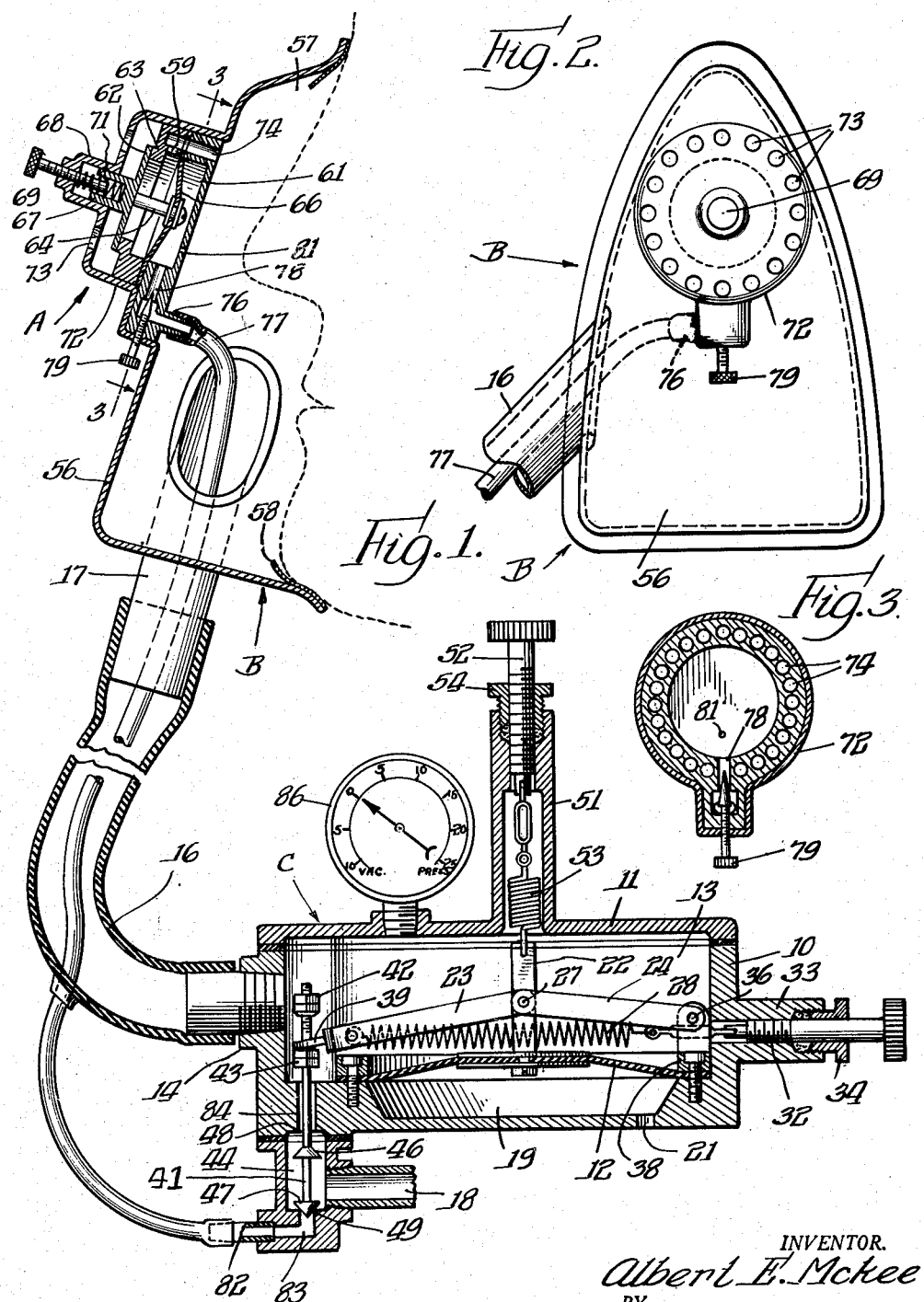
INVENTOR.
Albert E. McKee
BY
McLaughlin & Wallenstein
Attys.

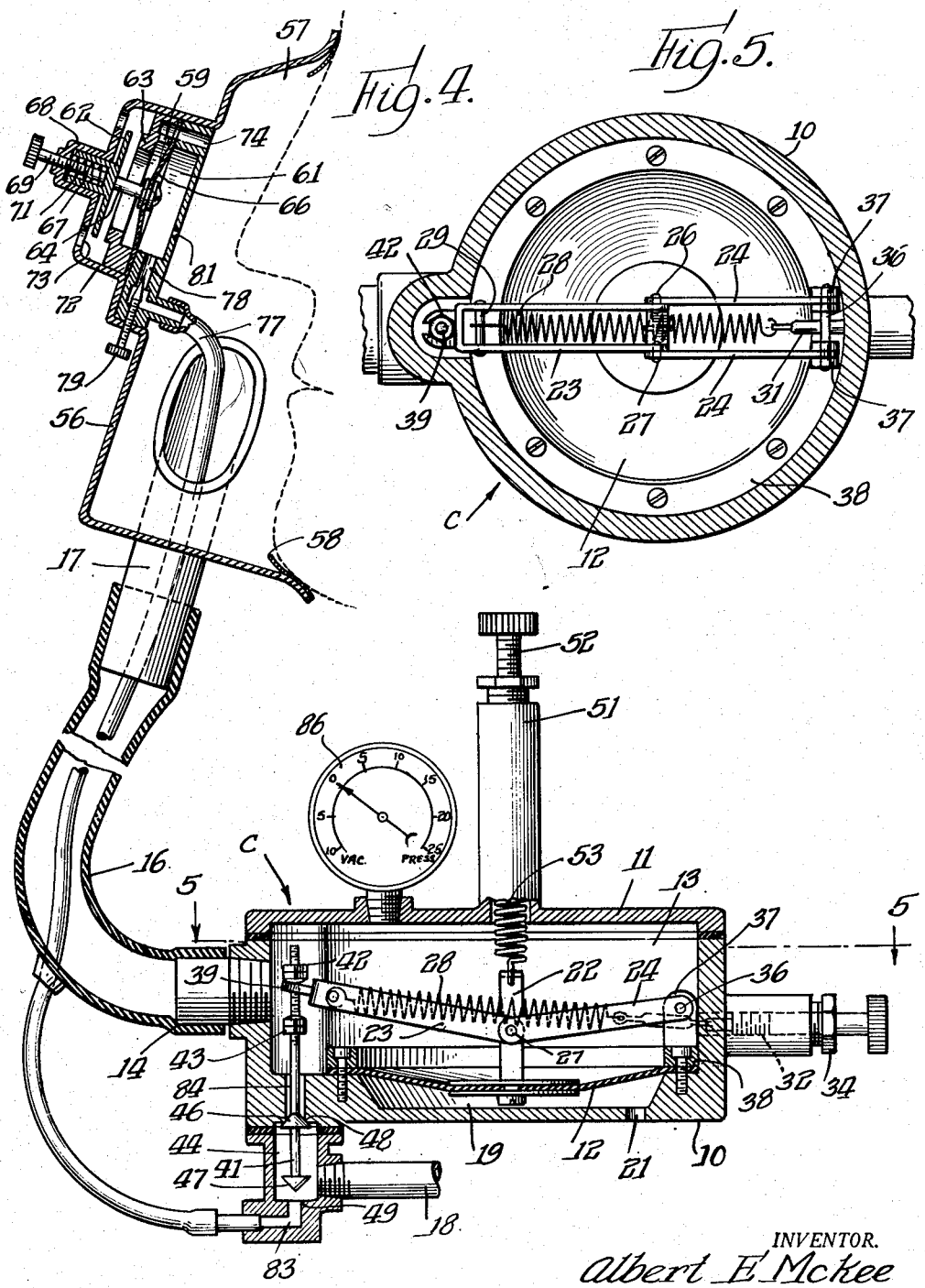

April 15, 1952 — A. E. McKEE — 2,593,046
OXYGEN ADMINISTRATION
Filed May 29, 1944 — 3 Sheets-Sheet 3
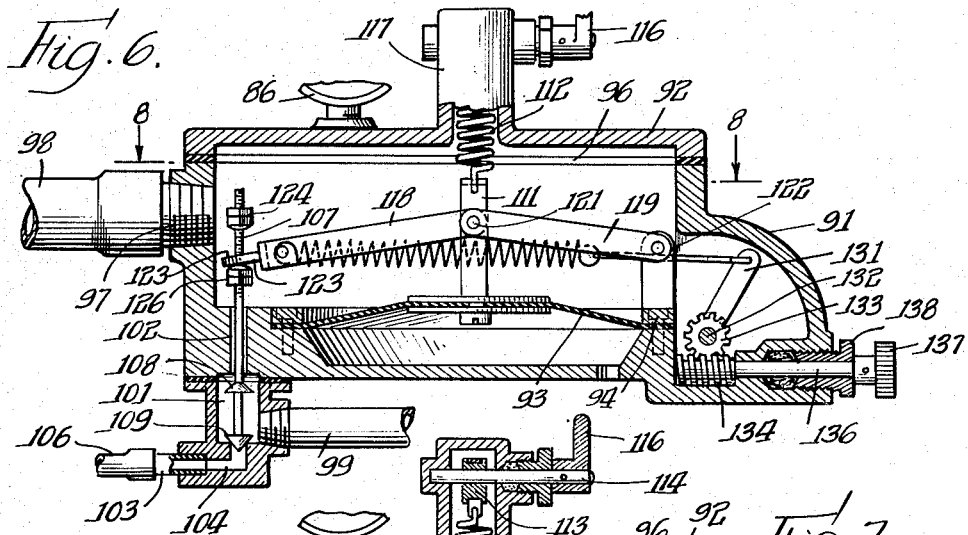
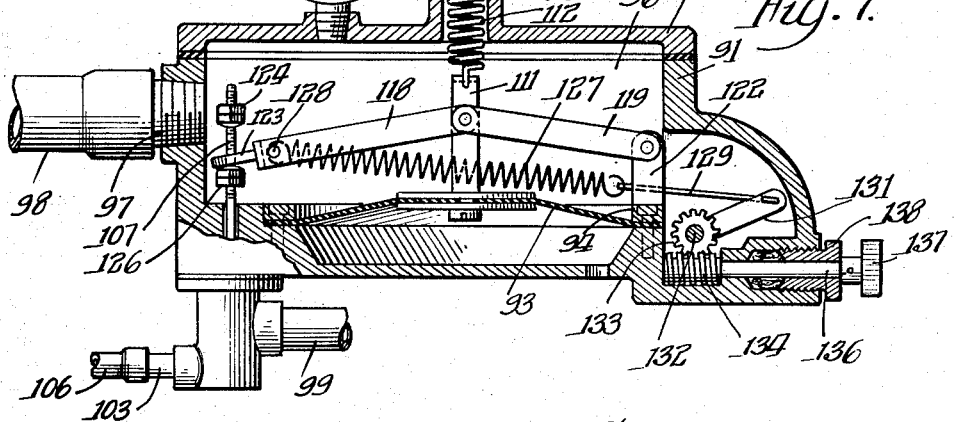
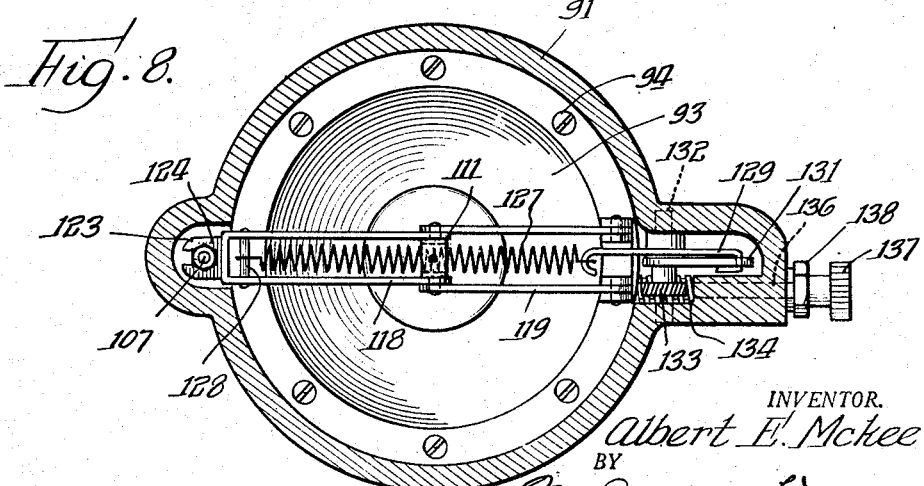
INVENTOR.
Albert E. McKee Patented Apr. 15, 1952

2,593,046

UNITED STATES PATENT OFFICE 2,593,046

OXYGEN ADMINISTRATION

Albert E. McKee, Chicago, Ill.

Application May 29, 1944, Serial No. 537,803

23 Claims. (Cl. 128—142)

My invention relates to oxygen administering systems and apparatus for use therewith.

It is well known that the increased rarefication of the atmosphere as altitude is gained results in loss of oxygen pressure and, therefore, in there being less oxygen available for conversion of methemoglobin to oxyhemoglobin in accordance with usual blood oxidation processes. When ordinary atmosphere is breathed at sea level, the actual oxygen pressure is less than 160 mm. of mercury, this being due to the fact that of the approximately 760 mm. of atmospheric pressure at sea level only approximately 21% of the atmosphere is oxygen and, therefore, only the oxygen portion of the atmosphere is available in the lungs to create pressure required for forcing oxygen through the alveolar walls into the blood stream. At altitudes up to about 10,000 feet, the oxygen pressure is not decreased sufficiently to cause any pronounced anoxemia, but above about 10,000 feet continued exertion generally will bring about impaired body functions and loss of efficiency. It is customary, therefore, to supplement atmospheric oxygen with pure oxygen above about 10,000 feet. This may either involve the breathing of pure oxygen above about 10,000 feet or the gradual increase of the supplementary oxygen up to about 30,000 feet, at which altitude substantially pure oxygen is necessary to maintain normal oxygen content of the blood. As altitude is gained, however, above about 30,000 feet, there is a loss of oxygen pressure due to the fact that apparatus generally made available for the delivery of oxygen to the user thereof necessarily supplies that oxygen substantially at ambient pressure, and a point is reached at somewhat under 38,000 feet at which the total atmospheric pressure is less than the oxygen pressure at sea level. In order substantially to maintain a normal amount of oxygen in the blood at these higher altitudes, therefore, it is essential that oxygen be delivered to the user thereof at a positive pressure, that is to say, a pressure above ambient or atmospheric pressure.

One proposed manner of supplying oxygen under pressure is to place an airplane passenger (pilot, crew member or actual passenger) in a sealed cabin which can be maintained at a relatively higher pressure than the atmosphere surrounding it, and within which the oxygen content can be controlled so that oxygen content and cabin pressure taken together will substantially maintain normal oxygen content in the blood of the cabin occupants. Such a proposal has not heretofore been found satisfactory, particularly for combat airplanes.

Another proposed method has been to supply oxygen under constant pressure to a mask or the like, but such method as heretofore proposed has required the user to exhale against a positive back pressure, that is to say, to force exhalation throughout the entire expiratory portion of the breathing cycle. Under certain circumstances, such a method is not without merit but it has several disadvantages, particularly in that it is not adaptable to varying conditions, it is tiring, it interferes with the so-called vanus return, if long continued, thus creating a condition equivalent to shock and, in the event of injury or loss of consciousness, it leaves the user helpless because of his inability to exhale against a positive back pressure.

The principal object of my invention is the provision of an improved system for administering oxygen.

Another object is the provision of a system which will be free of the faults and which will respond to the requirements discussed hereinabove.

Still another object is to deliver oxygen on the demand of the user to a controlled peak pressure and to permit exhalation against a reduced pressure of the general order of ambient pressure.

Other objects and features of the invention will be apparent from a consideration of the following detailed description taken with the accompanying drawings wherein:

Fig. 1 is a sectional view, with parts broken away to conserve space, showing apparatus adapted to operate in accordance with the features of my present invention;

Fig. 2 is a fragmentary front elevational view of the mask showing an expiratory valve in position thereon;

Fig. 3 is a transverse sectional view through the expiratory valve taken on the line 3—3 of Fig. 1;

Fig. 4 is a view similar to Fig. 1 but showing the parts in a modified position;

Fig. 5 is a plan sectional view taken on the line 5—5 of Fig. 4 looking in the direction of the arrows;

Fig. 6 is a sectional view taken through a regulator having a modified construction;

Fig. 7 is a view similar to Fig. 6, but showing the regulator adjusted to produce a higher peak pressure; and Fig. 8 is a plan sectional view taken on the line 8—8 of Fig. 6 looking in the direction of the arrows.

I shall first describe the modification of my invention as shown in Figs. 1 to 5, inclusive. As there shown the apparatus comprises an expiratory valve A placed in a mask B with a regulator C for controlling the delivery of oxygen to the mask. The regulator C, which has been shown somewhat simplified to clarify the construction and arrangement of the essential parts thereof, includes a housing 10 on which is placed a housing cap 11, forming above a diaphragm 12 an oxygen expansion chamber 13. A boss 14 leads to the expansion chamber 13 and has connected thereto a flexible tube 16 leading to an offset tube 17 communicating with the mask B. Oxygen under pressure is received from a high pressure line 18 and is rhythmically delivered in regulated amounts to the chamber 13 and thence to the mask B. The principal function of the regulator C is to control such delivery—that is to say, to control both the time of delivery and the amount thereof. The operation of the regulator is adapted to be under the control of the user or to operate automatically after the manner of a resuscitator, but all of this control is actually through the regulator.

The diaphragm 12 is mounted on an annular ledge of the housing 10 so as to form a lower chamber 19, which lower chamber 19 is at all times open to atmosphere because of the existence of aperture 21 in the lower part of the housing. The diaphragm is mounted in such a way, however, that the upper chamber 13 is not open to atmosphere. We have then, as a beginning relationship, the fact that atmosphere is effective against the lower part of the diaphragm and oxygen pressure in the chamber 13 is effective above the diaphragm.

Secured centrally of the diaphragm 12 is diaphragm stem 22 which stem also forms a central member of a toggle switch including arms 23 and 24—24. The stem 22 is U-shaped and so is the arm 23 so that separate pins 26 and 27 are employed to pivot arm 23 and arms 24—24 to the stem 22. The construction provides means for toggle spring 28 to occupy a position either above or below the center of the pivot comprising the pins 26 and 27. One end of toggle spring 28 is secured to a pin 29 extending across the two sections of the U-shaped toggle arm 23. The other end of toggle spring 28 is secured to a link 31 and the link 31 is secured to an adjusting screw 32 threaded in a boss 33. A lock and packing nut 34 is provided to prevent the adjustment screw from moving out of adjustment and to seal the chamber at the point where the screw 32 projects therefrom. The toggle arms 24—24 are secured on an immovable pivot comprising pivot pins 36 which extend through the ends of the arms 24—24 and also through upstanding ears 37 formed on diaphragm retaining ring 38.

The construction and arrangement of the toggle mechanism is such that, the toggle spring 28 being under tension, the toggle will snap in the manner of an over-center switch to one of two extreme positions. Since the pivot pins 36 are not movable, but the U-shaped arm 23 is free to move, the end of the U-shaped arm 23 will move with a snap action to an uppermost or lowermost position depending upon the position of the diaphragm 12 as will be explained. The arm 23 carries a bifurcated extension 39 which engages on opposite sides of a valve stem 41. The valve stem 41 carries adjustable nut assemblies 42 and 43 so that the said valve stem is adapted to be moved upwardly or downwardly with the movement of the toggle mechanism. A high pressure oxygen chamber 44 is connected with the high pressure oxygen line 18 and delivery of oxygen therefrom is controlled by valves 46 and 47 adapted to engage valve seats 48 and 49, respectively. The valves are carried on stem 41 and when the valve stem is in its uppermost position, it closes valve 46 and unseats valve 47 as shown in Fig. 4, but when it is in its lowermost position, it closes valve 47 and unseats valve 46. The valves 46 and 47 and their valve stem 41 form valve means for controlling the supply of oxygen to the expansion chamber 13 and to the diaphragm chamber 61 of the expiratory valve A.

A tubular central boss 51 is carried by the housing cap 11 and an adjusting screw 52 is threaded in the top thereof. A diaphragm loading spring 53 has one end connected to the top of the diaphragm stem 22 and the other end connected to the bottom of adjusting screw 52. The adjusting screw is supported in position so as to minimize loss of oxygen pressure and a locking and packing nut 54 is provided to hold it in its adjusted position and provide an adequate seal.

The mask B may be of any suitable type but in the form shown comprises a frame 56 adapted to fit over the face and provide a mask chamber 57, a thin membrane 58 of rubber or the like being provided to seal the chamber so that both the mouth and nose are entirely enclosed. It will be understood that this is merely an illustrative arrangement, the sole purpose being to provide a mask having a chamber with which the nose or mouth or both communicate.

The expiratory valve A is supported directly upon the framework 56 of the mask. It includes an expiratory chamber 59 and a diaphragm chamber 61. An expiratory valve member 62 is adapted to engage against a seat 63. The expiratory valve member 62 is carried on a stem 64 of a diaphragm 66 defining one side of the diaphragm chamber 61. Integral with the stem 64 and expiratory valve member 62 is a tubular expiratory valve spring housing 67 reciprocable in a boss 68. An expiratory valve stop screw 69 is threaded in the boss 68 and expiratory valve spring 71 is disposed between the shank of screw 69 and the housing 67. The boss 68 is shown as formed integral with a cap 72 which, in turn, is integral with or secured to the frame 56 of the mask. The cap 72 is provided with a plurality of orifices 73. The expiratory valve chamber 59 is placed in communication with mask chamber 57 by a plurality of irregularly shaped passageways 74. The result of this construction is that when the expiratory valve member 62 is away from its seat, the mask chamber 57 is opened to atmosphere through passageways 74, the unseated valve 62 and orifices 73.

The frame defining a portion of the expiratory valve diaphragm chamber 61 is provided with a boss 76 shaped to receive one end of an exipratory valve control line 77. A passageway 78 places the expiratory valve control line 77 in communication with chamber 61. An adjustable needle valve 79 controls the effective cross sectional area of such passage so that with a given vapor pressure, the speed at which vapor enters diaphragm chamber 61 from the control line 77 will be determined by the adjustment of the needle valve 79. A very small passageway 81 in the nature of a small drill hole is provided as a bleeder between the diaphragm chamber 61 and the mask chamber 57 for a purpose which will be described.

The expiratory valve control line 77 is shown in the form of a flexible tube extending through a substantial portion of the larger flexible tube 16 through which oxygen is adapted to be delivered to the mask chamber 57. The opposite end of the tube comprising the control line 77 is connected to a nipple 82 secured in a portion of the housing 10 of the regulator and communicating with a passageway 83 leading to high pressure oxygen chamber 44. A passageway 84 is provided between the high pressure oxygen chamber 44 and the expansion chamber 13, the passageway 84 being restricted and also being occupied by the valve stem 41. A gauge 86 is carried by the housing cap and connected to the interior of chamber 13. This gauge may be of suitable type, such as one using a usual form of Bourdon tube, operating a pointer moving over a suitably calibrated dial.

In operating the device of the present invention, the line 18 is connected to a source of oxygen under pressure, or a mixture of oxygen with another gas and the mask adjusted in position on the face. Assuming the parts to be in the position shown in Fig. 1, the oxygen flows from the chamber 44 through the passageway 84, and expands into the chamber 13. Thence the expanded oxygen flows through the flexible tube 16 to the mask chamber 57 where it is available for inhalation by the user. At the same time, the expiratory valve member 62 is held against its seat 63 by spring 71, this being made possible because the valve 49 is closed to prevent further flow of oxygen under pressure to chamber 61, and any oxygen under high pressure which was in the chamber 61 will have bled through the bleeder passageway 81 to the mask chamber 57. Oxygen continues to flow into the chamber 13 until a peak pressure has been built up determined by the adjustment of the adjusting screws 32 and 52, the adjustment of the latter having a special function which will later be explained. When the peak pressure has been developed, the center line or pivot point of the pins 26 and 27 is carried below the center line of the toggle spring 28. When this occurs the toggle snaps to the position shown in Fig. 4, thereby raising the valve stem 41. When the valve stem 41 is raised it engages the valve 48 against its seat, thereby preventing the admission of further oxygen to the expansion chamber 13 but admitting oxygen to the passageway 83 and thence through the expiratory valve control line to the passageway 61. This causes an expansion of the diaphragm as shown by contrasting Figs. 1 and 4, with the result that the expiratory valve assembly is carried outwardly and the expiratory valve member 62 is raised from its seat. This allows the subject to exhale through the expiratory valve and concomitantly opens the mask to atmospheric pressure. The user breathes against a restricted orifice, this being preferred to breathing directly to a relatively low pressure atmosphere. The position of the nut 69 determines the cross sectional area of the restricted orifice by limiting the outward movement of the expiratory valve assembly. It is usually desirable to maintain an average high pressure of oxygen so that, generally speaking, the expiratory valve should not be opened fully to place the mask chamber 57 in communication with atmosphere the very instant the peak pressure is reached. The provision of the needle valve 79 makes it possible to maintain the expiratory valve closed for a measurable portion of time after the peak pressure has been reached, and the valve 46 closed to prevent delivery of further oxygen through passageway 84.

My invention provides two ways in which the inspiratory portion of the breathing cycle may be initiated. If the tension of spring 53 is not quite sufficient to overcome the action of the toggle spring 28 when the parts are in the position shown in Fig. 4 and the chamber 13 has substantially reached ambient pressure (with substantially the same atmospheric pressure on both sides of the diaphragm), then as soon as the user of the apparatus makes a slight movement to inhale (that is to say, when he demands oxygen by starting to inhale) a very slight negative pressure is created in the chamber 13. Even though this pressure be very slight, the spring 53 can be adjusted so that such negative pressure is just sufficient to kick the toggle mechanism past dead center and restore the toggle to the position shown in Fig. 1. When adjusted in this manner, therefore, regardless of what the peak pressure may be at which oxygen delivery is discontinued, the inspiration portion of the cycle is not initiated until the demand of the user causes a reverse operation of the toggle mechanism. The result of operation of the toggle in the manner postulated is, of course, to establish the position of the valves shown in Fig. 1 and thereby to interrupt oxygen delivery to the diaphragm chamber 61 and start oxygen delivery to the expansion chamber 13, and thence to the mask chamber 57.

To operate the apparatus as a resuscitator, additional tension is applied to the spring 53 by slightly raising the adjustment screw 52. Enough added tension is applied to the spring so that it is adequate to overcome the force of the toggle spring 28, when the parts are in the position shown in Fig. 4, and when the pressure in the expansion chamber 13 is lowered substantially to ambient pressure. The manner of operation, when this adjustment is made, is substantially the same as previously described. The apparatus operates as previously described to inhibit further flow of oxygen and to open the expiratory valve when a peak pressure is attained, but the closing of the expiratory valve and re-starting of the flow of oxygen to the mask chamber now takes place automatically when a minimum pressure is attained. The minimum pressure at which the device will respond automatically to initiate the inspiratory portion of the breathing cycle may be ambient pressure or some positive pressure above ambient pressure; it must, of course, be a pressure lower than the peak pressure.

I have referred to adjustment of the tension of springs 28 and 53 but have not heretofore pointed out in any great detail the interdependency of these springs and the manner in which the relative tensions thereof are adjusted. Assuming the parts to be in the position shown in Fig. 4, it is at once apparent that if greater tension had been applied to spring 28 in order to increase the peak pressure required to force the diaphragm to the lowermost position shown in this figure, it will also be necessary to have a greater tension on spring 53 if the minimum pressure at which the diaphragm is returned to the position of Fig. 1 is to be maintained. If the tension of spring 53 be increased, however, it adds its force to the total forces urging the diaphragm downwardly when it is in the position shown in Fig. 1. It is obvious also that the peak pressure may be increased merely by adding greater tension to spring 53, but if this is done that minimum pressure at which the diaphragm and toggle mechanism will be returned to the position of Fig. 1 is also increased. Generally speaking, therefore, it will be necessary to adjust both springs in order to properly balance both the peak pressure and minimum pressure of expansion chamber 13. This may be done in various ways but in the embodiment shown the gauge 86 is of great importance and may be utilized not only for the purpose of determining the manner in which the device is functioning at any one time, but also for the purpose of the adjustment postulated.

The gauge 86 is shown graduated in inches of water. The pressures indicated are gauge pressures and the zero reading will correspond to ambient pressure. Let it be assumed that the apparatus is being operated as a simple demand regulator wherein the oxygen is delivered to the mask at a pressure above ambient only sufficiently high to cause a flow and operation of the toggle mechanism. This may be appreciably less than one inch of water. The gauge will then operate on the two sides of the zero reading, a slight negative pressure being created only momentarily at the time inhalation is first started. Assume now that it is desirable to operate with a peak pressure of 10 inches of water. The two adjustment screws 32 and 52 are manipulated to tension the spring 28 and 53 until at peak pressure the gauge reads 10 inches of water. If it is desired to lower the minimum pressure, the spring 28 is tensioned slightly and the tension of spring 53 decreased slightly and this adjustment continued until the proper minimum pressure has been reached. This manner of adjustment maintains regardless of whether the apparatus is functioning as a demand regulator or automatically as a resuscitator.

Assuming that the apparatus is operating automatically, then the spring 53 will return the toggle mechanism to the position of Fig. 1 as soon as pressure in chamber 13 reaches a minimum point somewhere between ambient and peak pressure. If now, it is desired to convert to operation on the demand principle, the tension of the spring is decreased so that a slight negative pressure must be created in the chamber 13 in order to return the toggle mechanism to initiate the inhalation portion of the cycle. This adjustment may be made until several inches of negative pressure (if by any chance such should be desired) are required to return the mechanism to the position of Fig. 1; but regardless of how low the minimum pressure is at which the inspiration portion of the cycle is initiated, continued negative pressure is not necessary during inhalation, the oxygen flowing and maintaining pressure at least equal to ambient at all times regardless of the adjustment of the diaphragm loading springs. If the tension of the spring 53 is decreased in the manner postulated immediately hereinabove, it may be necessary to increase the tension of spring 28 to maintain the proper peak pressure.

Those skilled in the art will understand that various refinements may be made in my invention without departing from the spirit thereof. The modification shown in Figs. 6 to 8, inclusive, illustrates a refinement in which the adjustment is simplified over that disclosed in the main embodiment. In this form of the invention, the housing 91 is provided with a cap 92 and a diaphragm 93 held in position by a retaining ring 94 forms with the housing and cap an expansion chamber 96. A nipple 97 is provided for connecting tube 98 leading to a mask such as shown in Fig. 1. A high pressure oxygen line 99 delivers oxygen to a high pressure chamber 101. The high pressure chamber communicates with expansion chamber 96 through passageway 102 and to a nipple 103 through passageway 104, the nipple 103 adapted to connect with an expiratory valve control line 106. As in the previous embodiment, a valve stem 107 carries valves 108 and 109 to control the flow of oxygen from chamber 101 through passageways 102 and 104, respectively.

Diaphragm stem 111 is connected to the center of the diaphragm 93 and has its upper end connected to a spring 112. The upper end of the spring is engaged over an eccentric 113 carried by a cross shaft 114, the position of which is controlled by an arm 116. The cross shaft 114 is suitably sealed through a tubular upper portion 117 of the housing cap 102 to prevent loss of oxygen, and the spring 112 is so positioned as to be held centrally of the tubular portion 117 and maintained in contact with eccentric 113.

A toggle mechanism is provided similar to that in the previously described embodiment including toggle arms 118 and 119 pivoted at 121 to each other and to the diaphragm stem 111. The two arms 119 are pivoted to ears 122 upstanding from the diaphragm retaining ring 94. The outside end of arm 118 is free to move up and down and has a bifurcated end 123 engaging on opposite sides of the valve stem 107 and adapted to engage nuts 124 and 126 carried thereby. A toggle spring 127 has one end secured to a pin 128 carried by toggle arm 118 and the other end pinned to a link 129 carried by an arm 131. As in the previously described embodiment, the construction is such that spring 127 may lie above or below the pivot point 121. Arm 131 is carried by a shaft 132 integral with a worm gear 133. The worm gear 133 is adapted to be turned by a worm 134 carried on peak pressure regulating shaft 136. The shaft 136 has an exterior thumb nut 137 with a lock and packing nut 138 surrounding the shaft 136 and so constructed that tensioning of the lock and packing nut 138 will hold the shaft 136 against turning and seal the chamber 13. This construction is illustrative, as any other suitable anchoring means may be utilized.

The two adjustments of the toggle spring 127 shown in Figs. 6 and 7 illustrate the operation of the embodiment shown in these figures. In Fig. 6 there is less tension on spring 127 than in Fig. 7. The arm 131 has functioned in Fig. 7 not only to apply greater tension to spring 127 and thereby to increase the peak pressure at which the parts are brought to a position to close the valve 108 and open valve 109, but arm 131 has also had the effect of dropping the center line of spring 127 with respect to the pivot point 121. This means that the diaphragm will have to move a greater distance downwardly before the toggle mechanism reaches a position over center to cause it to snap to the opposite position; while, on the opposite movement, which will result in again opening valve 108, the diaphragm will have to move a lesser distance and less real effort will be necessary to move it. By this means the minimum pressure at which the diaphragm and toggle mechanism are returned to initiate the inspiration portion of the cycle may remain substantially constant regardless of the adjustment of the peak pressure.

The device of the embodiment just described is adapted to function as a demand regulator or automatically as a resuscitator and the control thereof, of the peak pressure in either case, comprises the arm 116, eccentric 113 and cross shaft 114. In the embodiment shown the arm 116 is adapted to have two positions, in one of which there is slightly more tension on the spring 112 than in the other. When spring 112 has its minimum tension, then it is not quite strong enough to return the diaphragm to its uppermost position and a slight negative pressure created on demand of the user is necessary to return the diaphragm to a position to initiate the inspiratory portion of the breathing cycle. When the spring has its greater tension, then it is just strong enough to overcome spring 127 and raise the diaphragm (with the help of spring 127 when the center line of spring 127 passes the center of pivot 121) when the pressure in chamber 96 is lowered to approximately ambient pressure.

The apparatus constructed in accordance with the embodiment of Figs. 6 to 8, inclusive, may be adjusted in many ways, optionally merely to satisfy the needs of the user thereof. I show a gauge 139, however, as a simple indication of one manner of determining how the mechanism is operating and facilitating control thereof. If the device is being employed for the treatment of pulmonary edema, for example, the regulation is under the control of an operator who adjusts the peak pressure to the needs of the patient and also adjusts the tension of spring 112 to cause the mechanism to operate automatically or on demand of the user depending upon the wishes of the attending physician.

My present invention may be employed in any way required by a user himself or as determined by another such as a physician or technical advisor. I have discussed the manner in which some of the controls may be maintained, but those skilled in the art will understand that the delivery of a suitable gas or mixture of gases under pressure to the high pressure line 18 or 99, as the case may be, may be controlled by various means known in the art. The controls are indicated as arranged for manual operation but it is known that various kinds of automatic devices may be employed for the purpose such as pressure responsive devices, devices responsive to oxygen balance in the blood, and the like.

The principal features are built around the diaphragm or like unit, with variable and varying oxygen pressure on one side thereof and atmospheric pressure at the other side thereof. Except for changes in altitude, the atmospheric pressure remains fixed; it does not fluctuate appreciably in a single breathing cycle as does the pressure in the diaphragm chamber. The expiratory valve is opened by oxygen pressure controlled by the operation of the regulator, but the spring 71 may be controlled so that regardless of pressure in the mask, the user can exert enough pressure to unseat the expiratory valve.

Further exemplification of the oxygen administration system of my invention may be had by reference to my copending application, Serial No. 530,968, filed April 14, 1944, now Patent No. 2,567,225, and particularly by reference to explanatory curves and the explanation thereof forming a part of the specification of such application.

The present invention is particularly adapted for the treatment of conditions wherein it is desired to administer oxygen or a mixture of oxygen and other gases (such, for example, as a mixture of oxygen and helium) at ambient pressures or controlled pressures above ambient pressure and to continue to do this safely and regardless of whether or not the inspiratory portion of the cycle is initiated on demand of the user or automatically. My invention is not limited in any respect, however, to therapeutic work but may have a very real advantage in any situation where supplemental oxygen is required, such as in combat airplanes.

What I claim as new and desire to protect by Letters Patent of the United States is:

1. In an oxygen feeding system, a mask, a valve device having a housing with one chamber in communication with the mask and one chamber communicating with atmosphere, a pressure responsive device between the two chambers and movable in response to a change in pressures between the two chambers, an expiratory valve having an orifice communicating with said mask, a pressure responsive device controlling said expiratory valve to operate it in one direction, said valve being biased for movement in an opposite direction, a line supplying oxygen under pressure, valve means in said line for controlling the supply of oxygen to said mask and to the second-mentioned pressure responsive device, over center switch means for operating said valve means and operated by the first-mentioned pressure responsive device when the pressure in the mask reaches a predetermined peak pressure, said valve means functioning to deliver oxygen to said second mentioned pressure responsive device and open said expiratory valve and at the same time to interrupt oxygen flow to said mask, and adjustable spring means biasing said first-mentioned pressure responsive device toward said first mentioned chamber, said means being just insufficient to operate said oxygen valve means and deliver oxygen to said mask when the pressure therein approaches atmospheric pressure, but responding to move said first-mentioned pressure responsive device and operate said valve means when a slight negative pressure is established, and means for additionally loading said first-mentioned pressure responsive device to cause return movement and operation of said valve means to admit oxygen when the pressure in the mask is lowered substantially to atmospheric.

2. In an oxygen feeding system, a mask, a valve device having a housing with one chamber in communication with the mask and one chamber communcating with atmosphere, a pressure responsive device between the two chambers, an expiratory valve having an orifice communicating with said mask, a pressure responsive device controlling said expiratory valve to open the same, said valve being biased for closing movement thereof, a line supplying oxygen under pressure, a valve means in said line controlling flow of oxygen to said mask and said pressure responsive device for said expiratory valve, over-center switch means for operating said oxygen valve means and operated by the first-mentioned pressure responsive device when the pressure in the mask reaches a predetermined peak pressure, to interrupt oxygen flow to said first-mentioned chamber and mask, and adjustable spring means biasing said first-mentioned pressure responsive means toward said first-mentioned chamber, said means being just insufficient to operate said oxygen valve means and deliver oxygen when the pressure therein approaches atmospheric pressure, but responding to move said first-mentioned pressure responsive means and operate said oxygen valve means when a slight negative pressure is established, and means for additionally loading said pressure responsive device to cause return movement and operation of said oxygen valve means to admit oxygen when the pressure in the mask is lowered substantially to atmospheric.

3. In an oxygen feeding system, a mask, a valve device having a housing with one chamber in communication with the mask and one chamber communicating with atmosphere, a pressure responsive device between the two chambers, an expiratory valve having an orifice communicating with said mask, a pressure responsive device controlling said expiratory valve to move the said valve in one direction, said valve being biased for movement in a direction opposite to that caused by said pressure responsive device, a line supplying oxygen under pressure, a valve means in said line controlling flow of oxygen to said mask and said pressure responsive device for said expiratory valve, over-center switch means for operating said oxygen valve means and operated by the first-mentioned pressure responsive device when the pressure in the mask reaches a predetermined peak pressure, to interrupt oxygen flow to said first-mentioned chamber and mask, and adjustable spring means biasing said first-mentioned pressure responsive means toward said first-mentioned chamber, said means being just insufficient to operate said oxygen valve means and deliver oxygen when the pressure therein approaches atmospheric pressure, but responding to move said first-mentioned pressure responsive means and operate said oxygen valve means when a slight negative pressure is established, and means for additionally loading said pressure responsive device to cause return movement and operation of said oxygen valve means to admit oxygen when the pressure in the mask is lowered substantially to atmospheric.

4. In an oxygen feeding system, a mask, a valve device having a housing with one chamber in communication with the mask and one chamber communicating with atmosphere, a pressure responsive device between the two chambers, an expiratory valve having an orifice communicating with said mask, a pressure responsive device controlling said expiratory valve to close the same, said valve being spring biased in one direction, and moved by oxygen pressure in the opposite direction, a line supplying oxygen under pressure, valve means in said line controlling flow of oxygen to said mask and to said pressure responsive device for said expiratory valve, over-center switch means for operating said oxygen valve means and operated by the first-mentioned pressure responsive device when the pressure in the mask reaches a predetermined peak pressure, to interrupt oxygen flow to said first-mentioned chamber and mask, and adjustable spring means biasing said first-mentioned pressure responsive means toward said first-mentioned chamber, said means being just insufficient to operate said oxygen valve means and deliver oxygen when the pressure therein approaches atmospheric pressure, but responding to move said first-mentioned pressure responsive means and operate said oxygen valve means when a slight negative pressure is established.

5. Apparatus for controlling flow of oxygen in an oxygen feeding system, comprising a valve structure including a casing having a low pressure chamber communicating with an outlet side of the valve, a diaphragm defining one side of said chamber, an over-center spring loaded toggle switch mechanism disposed in the said low pressure chamber, a high pressure chamber in said casing communicating with a source of oxygen, a valve mechanism controlling flow of oxygen from said high pressure chamber to said low pressure chamber, means for actuating said valve mechanism through said toggle switch mechanism, and means for activating said toggle switch mechanism in response to movement of said diaphragm, an expiratory valve actuated by oxygen pressure, and a valve forming a part of said valve mechanism, delivering oxygen from the high pressure chamber to the expiratory valve when oxygen flow to the diaphragm chamber is discontinued.

6. In an oxygen administration system, a housing including a diaphragm and diaphragm chamber on one side of the diaphragm, a mask in communication with said diaphragm chamber, means for delivering oxygen to said diaphragm chamber to create a pressure at least slightly above ambient pressure at one side of said diaphragm, the opposite side of the diaphragm being exposed to ambient pressure, a valve for controlling flow of oxygen from said oxygen delivery means to said diaphragm chamber and hence to the mask, operating means including said diaphragm for closing said valve when the pressure in the diaphragm chamber reaches a predetermined amount and for opening said valve when the pressure reaches a predetermined lower amount, an expiratory valve communicating with the mask and hence the diaphragm chamber, and pressure operated means constructed to open said expiratory valve upon closing of said oxygen controlling valve and to close said expiratory valve upon opening of said oxygen controlling valve to permit inspiration of oxygen after a portion of a breathing cycle has been given over to expiration.

7. In an oxygen feeding system, a mask, a device having an expansion chamber and a high pressure chamber receiving oxygen under pressure, a conduit connecting said expansion chamber and said mask, an expiratory valve having a valve opening communicating with the mask, a valve member controlling said opening, a pressure responsive device moving said valve member in one direction and a spring moving said valve member in the opposite direction, a control conduit running from said high pressure chamber to said pressure responsive device, a connection between said high pressure chamber and said expansion chamber, valve means in said high pressure chamber constructed alternately to control the flow of oxygen to said pressure responsive device through said control conduit and to said expansion chamber through said connection, a movable pressure responsive element included in said expansion chamber and responsive to pressure therein and to ambient pressure, and spring biased linkage between said pressure responsive element and said valve means such that said valve means is closed to the expansion chamber and open to the pressure responsive device at a peak pressure and is opened to the expansion chamber and closed to the pressure responsive device at a lower pressure, said lower pressure being below ambient pressure.

8. In an oxygen feeding system, a mask, a device having an expansion chamber and a high pressure chamber receiving oxygen under pressure, a conduit connecting said expansion chamber and said mask, an expiratory valve having a valve opening communicating with the mask, a valve member controlling said opening, a pressure responsive device moving said valve member in one direction and a spring moving said valve member in the opposite direction, a control conduit running from said high pressure chamber to said pressure responsive device, a connection between said high pressure chamber and said expansion chamber, valve means in said high pressure chamber constructed alternately to control the flow of oxygen to said pressure responsive device through said control conduit and to said expansion chamber through said connection, a movable pressure responsive element included in said expansion chamber and responsive to pressure therein and to ambient pressure, spring biased linkage between said pressure responsive element and said valve means such that said valve means is closed to the expansion chamber and open to the pressure responsive device at a peak pressure and is opened to the expansion chamber and closed to the pressure responsive device at a lower pressure, said lower pressure being below ambient pressure, and means for further biasing said linkage to move said element in a direction to open said valve means to the expansion chamber and close said valve means to the pressure responsive device at a pressure at least as great as ambient pressure.

9. A spring responsive valve device for an oxygen feeding system comprising a housing having a high pressure chamber for receiving oxygen under pressure, an expansion chamber including a diaphragm responsive to the pressure in the expansion chamber and to ambient pressure, a connection between the expansion chamber and the high pressure chamber and an oxygen outlet communicating with the expansion chamber, a valve in the high pressure chamber for controlling the flow of oxygen from the high pressure chamber to the expansion chamber through the connection therebetween, a snap switch for opening and closing the valve including a link connected to said diaphragm and spring means associated with said link and diaphragm, said snap switch closing the valve when the pressure in the expansion chamber reaches a predetermined peak pressure above atmospheric pressure and opening the valve when the pressure in the expansion chamber drops below atmospheric pressure, and adjusting means for said spring means for opening the valve when the pressure in the expansion chamber drops from the peak pressure to atmospheric pressure or above.

10. A valve device for controlling oxygen flow comprising an expansion chamber including a diaphragm having one side communicating with said expansion chamber and the other side with ambient pressure, a high pressure oxygen chamber, a connection between the high pressure chamber and the expansion chamber, a control conduit for auxiliary apparatus communicating with the high pressure chamber, valve means in the high pressure chamber for delivering oxygen to the expansion chamber when in a first position and to the control conduit when in a second position, spring biased linkage between said diaphragm and valve means for operating said valve means to the second position when the pressure in the expansion chamber rises to a peak pressure and to the first position when the pressure in the expansion chamber drops below ambient pressure, and means for regulating the spring bias of the linkage independently to adjust the pressure values at which the valve means is moved to the first and second positions.

11. In a regulator of the class described, an oxygen delivery line, valve means operable to initiate and interrupt the delivery of oxygen from a pressure source to said line, a diaphragm operated in response to pressures in said delivery line, a mechanism for operating said valve means in response to operation of said diaphragm to initiate delivery of oxygen and permit a high pressure in said delivery line when the pressure in the delivery line reaches a predetermined low value and to interrupt delivery of oxygen and permit a low pressure in said delivery line when the pressure in the delivery line reaches a predetermined high value, and means to adjust both the high and low pressure values in said line at which said diaphragm and mechanism operate said valve means, said last mentioned means being adjustable to require either a positive or negative pressure in said delivery line to initiate oxygen flow after it has been interrupted.

12. In a valve mechanism for an oxygen administration system, an outlet side including an oxygen delivery conduit and a diaphragm chamber communicating therewith, a diaphragm enclosing the chamber and exposed to ambient pressure, means for supplying oxygen under pressure to said diaphragm chamber and delivery conduit of said outlet side, means for loading said diaphragm against oxygen pressure admitted to said diaphragm chamber, valve means including a snap switch connected to and operated by said diaphragm to control oxygen flow under pressure to said diaphragm chamber and delivery conduit of said outlet side, said valve means operating to cause oxygen flow to discontinue only when a peak pressure above ambient pressure is attained in said diaphragm chamber, said diaphragm loading means being just insufficient to operate said valve means to initiate oxygen flow at ambient pressure, but said diaphragm moving sufficiently on slight inspirational demand of a subject to trip the valve means to initiate oxygen flow.

13. In a valve mechanism for an oxygen administration system, an outlet side thereof including a communicating mask and diaphragm chamber, means for supplying oxygen under pressure, valve means controlling flow of oxygen from said oxygen supplying means to said diaphragm chamber and mask, a movable diaphragm included in the diaphragm chamber and exposed to ambient pressure and connected to said valve means for controlling said valve means, said diaphragm operable on demand for oxygen to cause a flow thereof substantially at ambient pressure through said valve means and discontinuance of flow when inhalation ceases, means for loading said diaphragm whereby to cause the oxygen flow to discontinue only when a peak pressure above ambient pressure is attained, said valve means including a valve member and an overcenter switch connected to said diaphragm and to said valve member for admitting oxygen to said diaphragm chamber, an expiratory valve connected to the mask and spring biased in one direction, and means including another valve member of said valve means for moving the expiratory valve in the opposite direction by delivery of oxygen thereto directly from the oxygen supplying means under control of said last mentioned valve member.

14. In a valve device for an oxygen feeding system of the character described, an outlet side, a valve movable to control delivery of oxygen from a pressure source to said outlet side, a diaphragm mechanism responsive to pressure at said outlet side, mechanism responsive to operation of said diaphragm mechanism for controlling the movement of said valve, said mechanism being constructed to be actuated for opening said valve on establishment of a negative pressure at said outlet side and for closing said valve when a predetermined peak pressure is attained at said outlet side, and means for loading said mechanism to control the peak pressure at said outlet side independently of the valve opening pressure.

15. In a valve device for an oxygen feeding system of the character described, an outlet side, a valve movable to control delivery of oxygen from a pressure source to said outlet side, a diaphragm mechanism responsive to pressure at said outlet side, mechanism responsive to operation of said diaphragm mechanism for controlling the movement of said valve, said mechanism being constructed to be actuated for opening said valve on establishment of a negative pressure at said outlet side and for closing said valve when a predetermined peak pressure is attained at said outlet side, means for loading said mechanism to control the peak pressure at said outlet side independently of the valve opening pressure, and means for indicating to a user the setting of said loading means and the peak pressure resulting therefrom.

16. In an oxygen administration system, a mask, an oxygen source, a demand regulator mechanism communicating with said mask and said source and including pressure operated valve means for controlling flow of oxygen from said source to said mask, said demand regulator mechanism being constructed to initiate oxygen flow in response to a slight negative pressure in said mask below ambient pressure, to supply oxygen to the mask at substantially ambient pressure and to interrupt the flow of oxygen in response to a peak pressure in said mask slightly above ambient pressure, said demand regulator mechanism having adjusting means to regulate the pressures at which said mechanism responds, including means to cause said mechanism to operate automatically as a resuscitator, an expiratory valve in the mask, and pressure operated means including the valve means of the demand regulator mechanism constructed to open the expiratory valve to ambient pressure at the end of an oxygen supply cycle.

17. In an oxygen administration system, a mask, a source of oxygen, a demand regulator mechanism for supplying oxygen from said source to said mask and including a pressure responsive diaphragm responsive to pressure in said mask and valve means operated by the diaphragm constructed to initiate flow of oxygen from said source to said mask on attainment of a minimum demand pressure and to interrupt flow on attainment of a peak pressure, means for loading said diaphragm to control said peak pressure, means for loading said diaphragm to raise the minimum pressure at which said oxygen flow is initiated whereby to deliver oxygen to said mask under pressure rhythmically but without accompanying demand of the user, an expiratory valve associated with said mask, and pressure operated means including the valve means of the demand regulator mechanism constructed to open said expiratory valve in response to said peak pressure regardless of how oxygen flow is initiated and to close the same in response to said minimum pressure.

18. In an oxygen administration, a mask, an oxygen source, an oxygen delivery line leading to said mask, valve means controlling flow of oxygen from said source under pressure to said delivery line and mask, means including a pressure responsive member for controlling said valve means, said pressure responsive member being responsive to the pressure in said delivery line and having biasing means to operate the valve means and initiate oxygen flow on development of a slight negative pressure in the line and to interrupt oxygen flow at a peak pressure therein, said biasing means being constructed additionally to bias said diaphragm to raise said peak pressure response independently of said negative pressure response, an expiratory valve in the mask, and pressure operated means including said valve means constructed to open said expiratory valve in response to development of said peak pressure.

19. Oxygen regulating apparatus of the character described, including an oxygen delivery line, a mask in communication with said delivery line, a housing having a diaphragm, one side of which is in communication with said delivery line, a source of oxygen, valve means for controlling delivery of oxygen from said source to said delivery line, overcenter switch mechanism operated by movement of the diaphragm for operating the valve means, adjustable means primarily for loading said diaphragm just short of the point required to operate said switch mechanism to open said valve means, whereby slight negative pressure in said delivery line is adequate to operate said switch mechanism, open said valve means and deliver oxygen to said delivery line, other adjustable means primarily for loading the diaphragm for controlling the peak pressure in the delivery line required to move the diaphragm to a position to operate the switch mechanism and close said valve means, an expiratory valve opening said mask and atmosphere, a valve member for opening and closing said opening, and pressure operated means including said valve means constructed to operate said valve member for closing said opening during inhalation and opening said mask to atmosphere upon attainment of said peak pressure in the delivery line.

20. In an oxygen feeding system, a mask, a source of oxygen, means for providing and controlling flow of oxygen from said source to said mask, said means being constructed to deliver oxygen when demand of a subject establishes slight negative pressure and to discontinue flow of oxygen when a predetermined peak pressure is established, an expiratory valve in the mask, and pressure operated means including the oxygen flow controlling means constructed to open said expiratory valve when said peak pressure is attained.

21. In an oxygen feeding system, the combination of a mask, a source of oxygen, an oxygen flow control device responsive to slight negative pressure in said mask to deliver oxygen from said source to said mask and responsive to a controlled peak pressure in said mask to arrest such delivery, an expiratory orifice for the mask, a valve member for closing and uncovering said expiratory orifice, pressure operated means constructed to operate said valve member for closing said expiratory orifice during oxygen flow to the mask but responsive to said peak pressure to uncover said expiratory orifice, and means to restrict the flow of gaseous fluid through said expiratory orifice whereby to introduce expiratory resistance.

22. A system as defined in claim 6 wherein said operating means for the oxygen controlling valve includes adjusting means to permit establishment of the inspiration portion of the cycle either automatically or on demand of the user.

23. In an oxygen administration system of the character described, a mask, a pressure operated expiratory valve in the mask, a source of oxygen under pressure, means including valve means for supplying and controlling oxygen from said source to said mask and to said pressure operated expiratory valve, and means responsive to the pressure in said mask and constructed to operate said valve means to initiate the flow of oxygen to the mask and close the expiratory valve when the pressure in the mask decreases to a predetermined low value and to interrupt the flow of oxygen to the mask and open the expiratory valve when the pressure in the mask increases to a predetermined high value.

ALBERT E. McKEE.

REFERENCES CITED

The following references are of record in the file of this patent:

UNITED STATES PATENTS

| Number | Name | Date |
|---|---|---|
| 1,631,262 | Gourdou | June 7, 1927 |
| 2,121,311 | Anderson et al. | June 21, 1938 |
| 2,223,570 | McMillin | Dec. 3, 1940 |
| 2,268,172 | Sinnett | Dec. 30, 1941 |